United States Patent [19]

Haag et al.

[11] 4,303,987
[45] Dec. 1, 1981

[54] LOGIC STATE ANALYZER WITH GRAPHIC DISPLAY

[75] Inventors: George A. Haag, Colorado Springs; O. Douglas Fogg, Loveland; Gordon A. Greenley; Steve A. Shepard, both of Colorado Springs, all of Colo.; F. Duncan Terry, Meridan, Id.

[73] Assignee: Hewlett-Packard Company, Palo Alto, Calif.

[21] Appl. No.: 41,363

[22] Filed: May 22, 1979

Related U.S. Application Data

[62] Division of Ser. No. 828,138, Aug. 29, 1977, abandoned.

[51] Int. Cl.³ .................... G06F 3/153; G06F 3/05
[52] U.S. Cl. .................................................. 364/900
[58] Field of Search ............... 364/900 MS File; 340/739, 802

[56] References Cited

U.S. PATENT DOCUMENTS

| | | | |
|---|---|---|---|
| 3,659,282 | 4/1972 | Tada et a. | 340/739 |
| 3,835,455 | 9/1974 | Abbenante | 364/900 |
| 3,866,185 | 2/1975 | Etra et al. | 364/900 |
| 4,040,025 | 8/1977 | Morrill, Jr. et al. | 364/900 |
| 4,068,226 | 1/1978 | Bowman | 340/802 |

Primary Examiner—Harvey E. Springborn
Attorney, Agent, or Firm—Edward L. Miller

[57] ABSTRACT

A general purpose logic state analyzer selectively stores, formats and displays a digital signal representing a sequence of data states input thereto and provides a graphical display of the stored data states and a count of selected events occurring intermediate to the occurrence of the data states stored. Selective storage of the input data states is provided by comparing the input data states to a preselected sequence of first qualifier state conditions and enabling the storage of input data states in response to the satisfaction of the preselected sequence. Storage is further qualified by storing only data states which individually meet one of a preselected set of second qualifier state conditions. Selective formatting of the stored data states is provided by converting the stored data states in response to selectable assignments of contiguous sets of bits of each stored data state to logical fields, a selectable concatenation of the logical fields, and to radicies selected for each of the respective logical fields. The converted stored data states can be displayed as a formatted listing or as a graphical display. In the graphical display the stored data bits corresponding to a selected logical field are interpreted as a binary magnitude and plotted as the ordinate and the chronological storage location is plotted as the ordinate and the chronological storage location is plotted as the abscissa on a cartesian coordinate system. A count of selected events is obtained from the contents of a binary counter and stored in a second memory in parallel with the storing of each data state. This counter can be incremented selectively in response to either an internal clock or in response to the detection of an input data state satisfying a selected count-qualifier state condition.

6 Claims, 16 Drawing Figures

--------FORMAT SPECIFICATION---------TRACE-COMPLETE----------------------

CLOCK SLOPE [+]
(+,-)

```
             POD              POD4       POD3       POD2       POD1
             PROBE          7------0   7------0   7------0   7------0
LABEL ASSIGNMENT            [AAAAAAAA] [AAAAAAAA] [DDDDDDDD] [XXXXXXXF]
  (A,B,C,D,E,F,X)            !!!!!!!!   !!!!!!!!   !!!!!!!!   !!!!!!!!
                                         ACTIVE CHANNELS
```

```
           LABEL              A      D      F
LOGIC POLARITY               [+]    [+]    [+]                     DESIGNATES A
   (+,-)                                                   ▓▓▓▓    SELECTABLE
NUMERICAL BASE              [HEX]  [HEX]  [BIN]                    ENTRY FIELD
  (BIN,OCT,DEC,HEX)
```

FIGURE 1

--------TRACE SPECIFICATION---------TRACE-COMPLETE-----------------------

```
              LABEL      A     D    F    OCCUR
              BASE      HEX   HEX  BIN    DEC

FIND IN SEQUENCE       [03CF] [XX] [X]  [00002]
            THEN       [03E2] [XX] [X]  [00003]
            THEN       [00E1] [XX] [XX] [00001]
[START]    TRACE       [03E3] [XX] [X]  [0000F]

SEQ RESTART [ON] [03E4] [XX] [X]

TRACE
    [ONLY STATE]       [03E1] [XX] [X]  [00001]

COUNT [STATE] [03E1] [XX] [X]
```

FIGURE 2

--------TRACE LIST---------------TRACE-COMPLETE-------------------------

```
          LABEL     A     D   F    STATE COUNT
          BASE     HEX   HEX HEX        DEC
                                      [REL]
SEQUENCE...03CF...5D...0...
SEQUENCE   03E2   A2   0                2
SEQUENCE   00E1   C6   0                3
   START   03E3   82   0                1
    +01 ...03E3...E1...0..............|
    +02    03E3   E5   0                |
    +03    03E4   82   0                |
    +04    03E4   03   0                |
    +05 ...03E4...47...0..............|
    +06    03E1   A2   0                |
    +07    03E1   1D   0                |
    +08    03E1   5D   0                |
    +09 ...03CE...5D...0..............|
    +10    03CE   44   0                |
    +11    03E2   A2   0                |
    +12    03E2   C2   0                |
    +13 ...03E2...C6...0..............|
    +14    00E1   C6   0                |
    +15    03E3   82   0                |
    +16    03E3   E1   0                |
```

LOGIC STATE ANALYZER WITH GRAPHIC DISPLAY

CROSS REFERENCE TO RELATED APPLICATIONS

This application is a division of an earlier filed copending application of the same inventors and assignee, Ser. No. 828,138, filed Aug. 29, 1977, abandoned in favor of a continuing application Ser. No. 075,787 filed on Sept. 17, 1979, which in turn was abandoned in favor of a continuing application Ser. No. 210,462 filed on Nov. 25, 1980.

The subject matter of the present application is related to copending U.S. Patent Application Ser. No. 672,226 entitled LOGIC STATE ANALYZER filed Mar. 3, 1976, by Justin S. Morrill, Jr. et al., now U.S. Pat. No. 4,040,025 and is related to copending U.S. Patent Application Ser. No. 743,188 entitled DIGITAL PATTERN TRIGGERING CIRCUIT filed Nov. 19, 1976, by William A. Franbach, now U.S. Pat. No. 4,100,532. These patents are expressly incorporated by reference.

BACKGROUND AND SUMMARY

Prior art logic analyzers provide merely for enabling the storage of input data states in response to a selected number of satisfactions of a single preselected qualifier state condition and for the storage of data states satisfying a second qualifier state condition. Display modes have comprised formatted listings or certain vector mappings based solely on the entire data state stored.

Input data states can be formatted by assigning certain contiguous sets of bits to letter labels. Each label is subsequently treated as an independently addressable field and an independent radix can be selected for each label. Subsequent operation and references to the input data are now made by referring to these labels. In a tabular display the label fields are concatenated in alphabetical order.

While a tabular display is useful it is often easier to refer to a cartesian coordinate graph of the stored information. Often the item of interest either increments or decrements monotonically, or has a graph whose shape is readily recognized as either proper or improper. Furthermore, a graph is more easily interpreted than a vector mapping. And although tabular display does contain the same information as a graph, it takes longer to ascertain what that information is.

Accordingly, a graphic display means provides a cartesian coordinate graph of the values of a selected label field as a function of the locations in memory at which those values are stored. The graph can be restricted to a portion occurring between selected upper and lower limits for the value of selected label field.

DESCRIPTION OF THE FIGURES

FIG. 1 illustrates the interactive format specification display.

FIG. 2 illustrates the interactive trace specification display.

FIG. 3 illustrates a trace list display of the stored data states.

FORMAT SPECIFICATION

Data formatting permits the partitioning of 32 input data channels into parameters of interest. Contigious data channels which behave as a single parameter may be assigned to one of six labels (A-F). For example, in FIG. 1, illustrating the interactive format specification display, 16 bits of an address bus have been assigned to label "A", 8 bits of a data bus have been assigned to label "D", 1 bit of data on pod 1 has been assigned to label "F", and 7 bits have been left unassigned (labeled "X"). Further specifications and data manipulations are made by referencing these labels. Each assigned label may be independently declared to have a positive or negative "logic polarity" and converted to an independently selected radix which can be binary, octal, decimal or hexedecimal. Further, the slope of the positive or negative clock transition at which time the input data channels are sampled can be selected ("clock slope").

Figure 15:
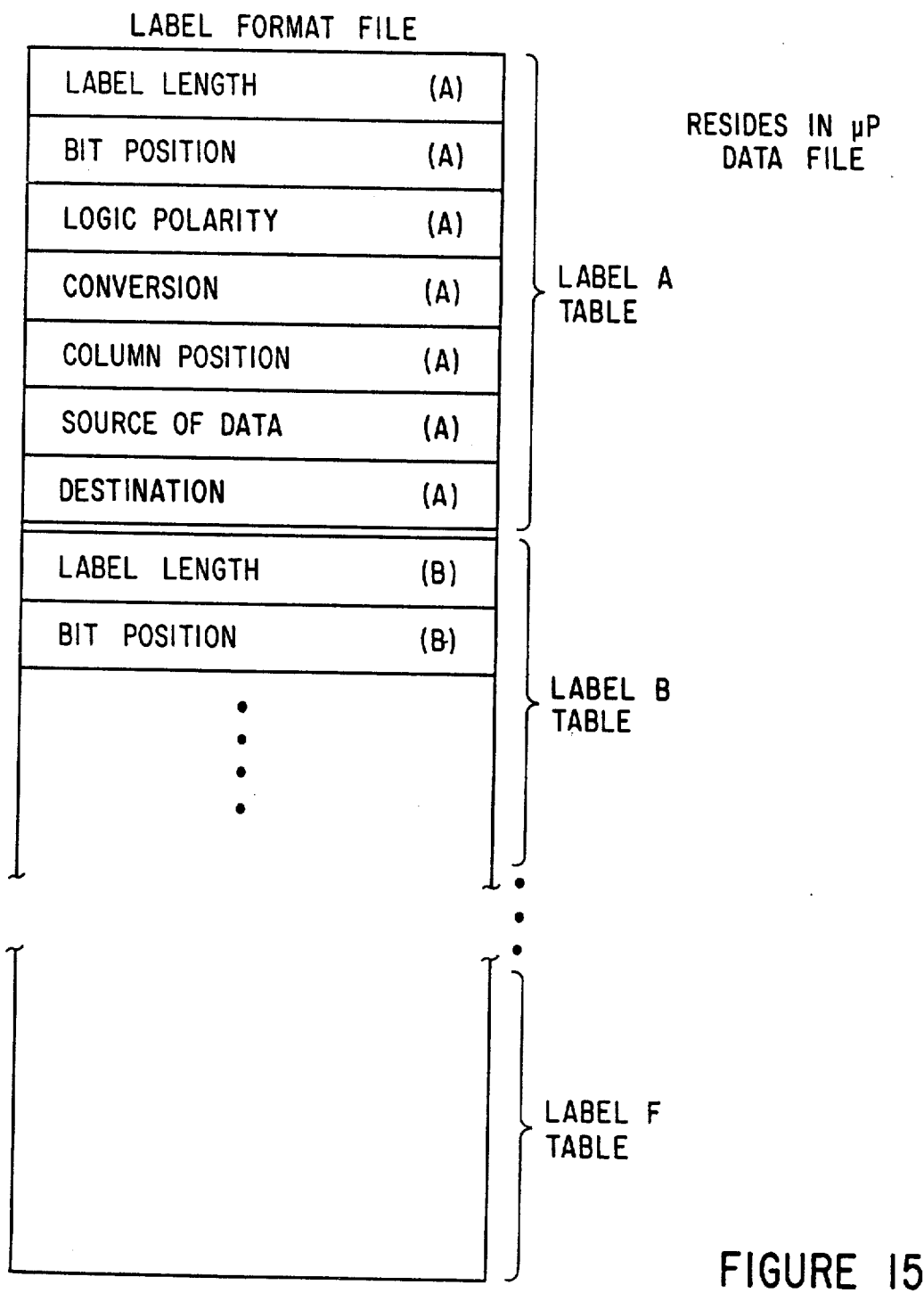
FIG. 15 illustrates the format of the label format file.
Figure 16:
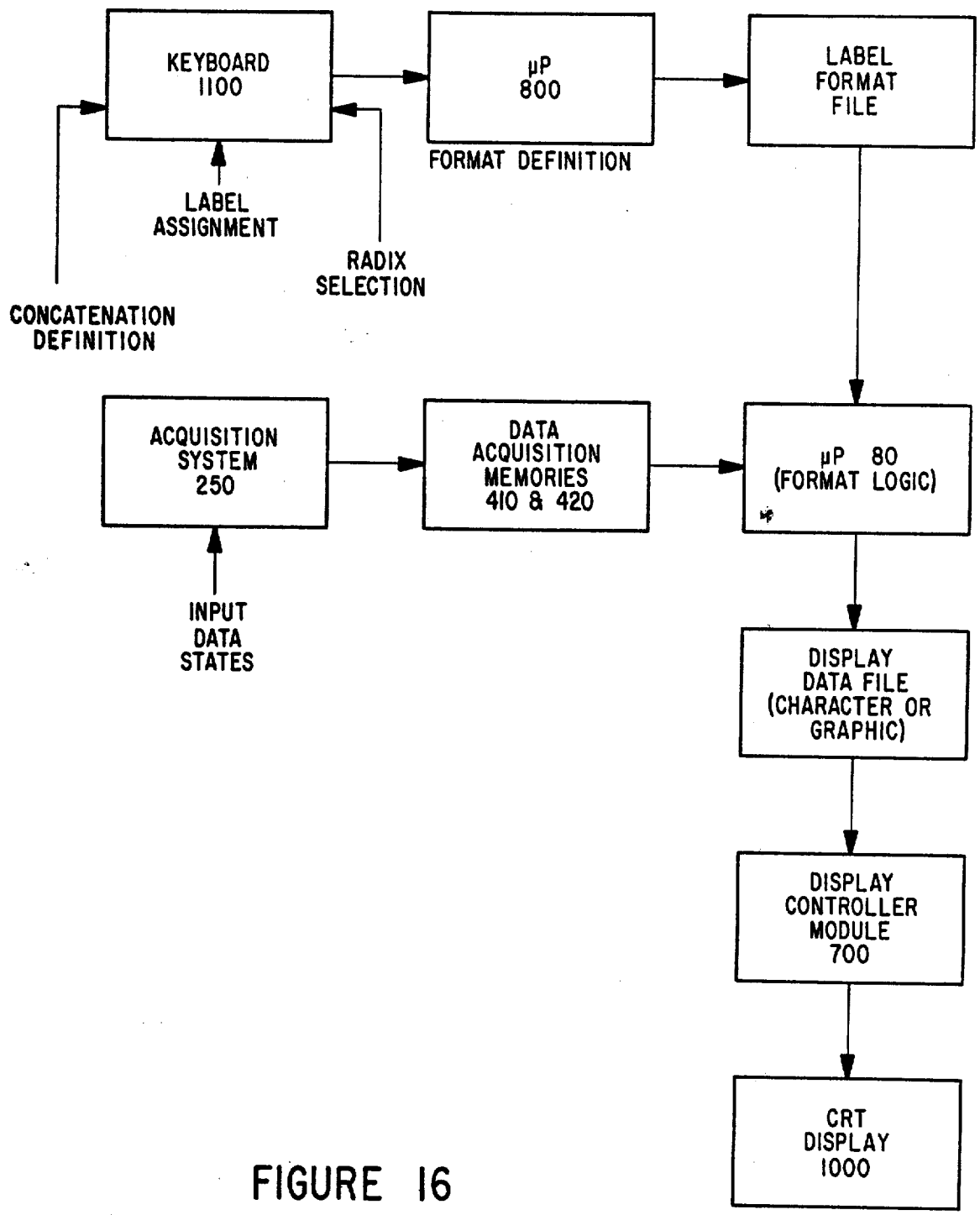
FIG. 16 illustrates the logic flow of the display formatting logic.

Keyboard entries to the microprocessor 800, as shown in FIG. 16, permit the construction of the label format file, shown in more detail in FIG. 15 which, contains the format specification parameters. This is used to process the stored data states in the construction of the alphabetically cancatenated ASCII display data file and the graphic display data file. Either of the display data files is subsequently selected and used for display purposes by the display control module 700 and the CRT display 1000.

TRACE SPECIFICATION

The assigned input data channels are sampled at the specified clock transitions and are treated as one sampled state. The trace specification defines which of the sampled states are to be stored for display and which sampled states are to be counted for count measurements. The trace specification comprises a definition of state conditions specifying the trace position, the selective trace, and the count measurement. Each state condition defines a state of the assigned input data channels in any combination of 1's, 0's, and/or X's (don't care). In octal, decimal or hexedecimal bases the definition is defined in terms of the appropriate alphamumerics and X's.

A trace position may be selected to a start, center or end the selective trace in response to the input data satisfying a predefined state sequence. In this description it will be assumed that the trace position starts the selective trace. A state sequence of up to seven state conditions must be satisfied in a specified order, ignoring intermediate states which do not satisfy the state sequence. The simplest state sequence is a single state condition. Specific segments of branched, looped or nested forms of state flow may be directly located by properly defined state sequences. In addition, each state condition in a state sequence may be specified to occur from 1 to 65536 times before the state condition is satisfied. This form of positioning will locate the nth pass of a loop beginning at a give state condition. Clock delay may be incorporated by defining the nth occurrence of any state (an all don't care state specification). The trace logic may also be specified to restart the satisfaction of the predefined state sequence if it is not satisfied before or concurrently with the location of a predefined restart state condition. A restart on "any state" requires that the state sequence be satisfied without any unspecified intermediate states. For example, FIG. 2 illustrates the interactive trace specification display for a trace position starting upon the satisfaction of 4 state conditions in sequence. A restart state condition is also defined.

The selective trace is a qualification of which sampled states will be stored for display. One to seven state conditions may be "OR" specified for collection. Selectively tracing only sampled states of interest eliminates the clutter of unneccessary states and magnifies the apparent size of the trace beyond its 64 terms. Also, an occurrence term may be specified so as to store only every nth satisfaction of an "OR" specified state condition FIG. 2 illustrates the selective trace of every occurrence of a single state condition.

The count measurement performs a "time" or a "state" count associated with each of the (64) states stored and can be displayed in one of two formats:

absolute—the count from the trace position
relative—the count from the previous trace state The time count is performed by counting the occurrences of an internal clock between sequentially stored states and the display is in the units of second. A state count similarly counts the number of occurrences of a specified state condition ("count") between sequentially stored states. For example, specifying "any state" would result in a count of the selected clock transitions of the input data. In FIG. 2, a state count is performed on the occurrences of a specified state condition intermediate to each sampled state stored.

INTERNAL MEASUREMENT STORAGE

One complete measurement of 64 sampled states, which includes the sampled states satisfying the state conditions defining the state sequence and specifications of the format, trace, and display, may be internally stored. The "current measurement" may be stored or exchanged with a "stored measurement" for later analysis. A "trace compare" (described more fully below) compares results of a previously stored trace with the current measurement and may be utilized as a further qualifier on data storage.

DISPLAY SPECIFICATION

The output display format of the current measurement may be selected from a trace list, a trace graph, or a trace compare.

A trace list, illustrated in FIG. 3, displays a listing of the stored states in their order of occurrence. Twenty trace states, (one per line) are simultaneously presented on the CRT display. The "ROLL" keys allow scanning of the 64 stored states. Each line comprises a line number, the stored state alphabetically sorted into assigned labels in their numerical base, and the time or state count if selected.

Figures 4, 5:
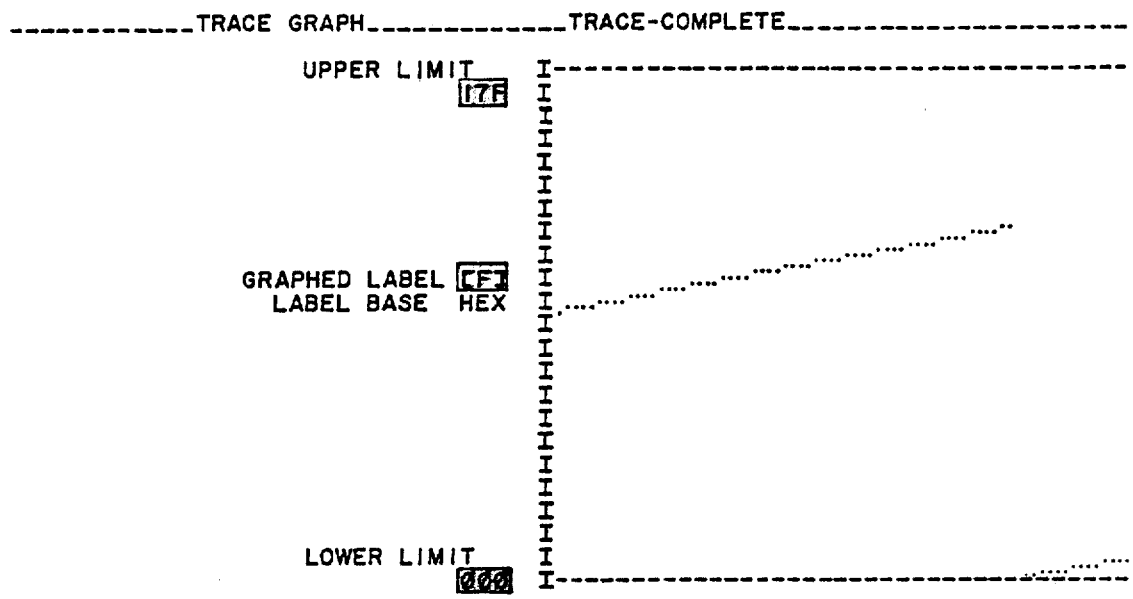
FIG. 4 illustrates a trace graph display of the stored data states.
FIG. 5 illustrates a trace compare output display list.

A trace graph, as shown in FIG. 4, presents a graph of the data magnitude of a specified label versus the storage location for all 64 stored states. Each state is given a vertical displacement corresponding to its binary magnitude and an increasing horizontal displacement for successive states in order of their occurrence. The result is a waveform analogous to oscilloscope displays of voltage magnitude. The label to be graphed is selected by specifying the "graphed label". Scaling of state magnitude is controlled by specifying the "upper limit" and "lower limit" on the vertical axis. Limits can be specified directly or dynamically varied with logrithmic autoranging controls. These facilities allow any portion of a graph to be magnified to a full scale presentation. The 20 points corresponding to the lines viewed in the trace list are intensified. The intensified portion also responds to the "ROLL" controls, and their corresponding absolute value may be read in the trace list.

A trace compare as illustrated in FIG. 5 presents a tabular listing of the difference between results in the "current measurement" and the data in the "stored measurement". The listing is formatted and rolled as in the trace list. The results of the two measurements are exclusive "ORED" such that identical corresponding bits are displayed as zeros and unequal bits are displayed as ones. In an octal base a "$\phi 3$" is equivalent to a binary "$\phi\phi\phi$ $\phi 11$" and indicates that the right two bits are different in the two measurements. Trace compare also offers a "compared trace" mode which reruns a measurement until the current and stored measurement are either equal or not equal. (STOP=, or STOP≠) For example, in FIG. 5 of the instrument has rerun trace measurements until the "current measurement" equaled the "stored measurement", as indicated by the "STOP=" specification and revealed by the array of "0's" in the comparison.

TRACE MODES

Three trace mode options are provided. "Trace" executes a single current measurement. "Continuous trace" repeats the execution of a current measurement continuously. "Compared trace" repeats the execution of a current measurement until the desired comparison with the stored measurement is obtained.

CLOCK ENABLE AND TRIGGER OUTPUTS

A trigger output provides a triggering pulse for external instrumentation such as oscilloscopes. A 50 ns pulse is generated each time the trace position is found. The clock enable output is useful for gating clocks or interrupting the device under test. A high signal level indicates that the instrument is actively searching for the trace position. It remains at the high signal level until the trace position has been found or the halt key is depressed. Both outputs are suspended when the format specification is displayed to allow measurement of channel activity.

KEYBOARD AND SPECIFICATION DESIGNATION

Figure 6:
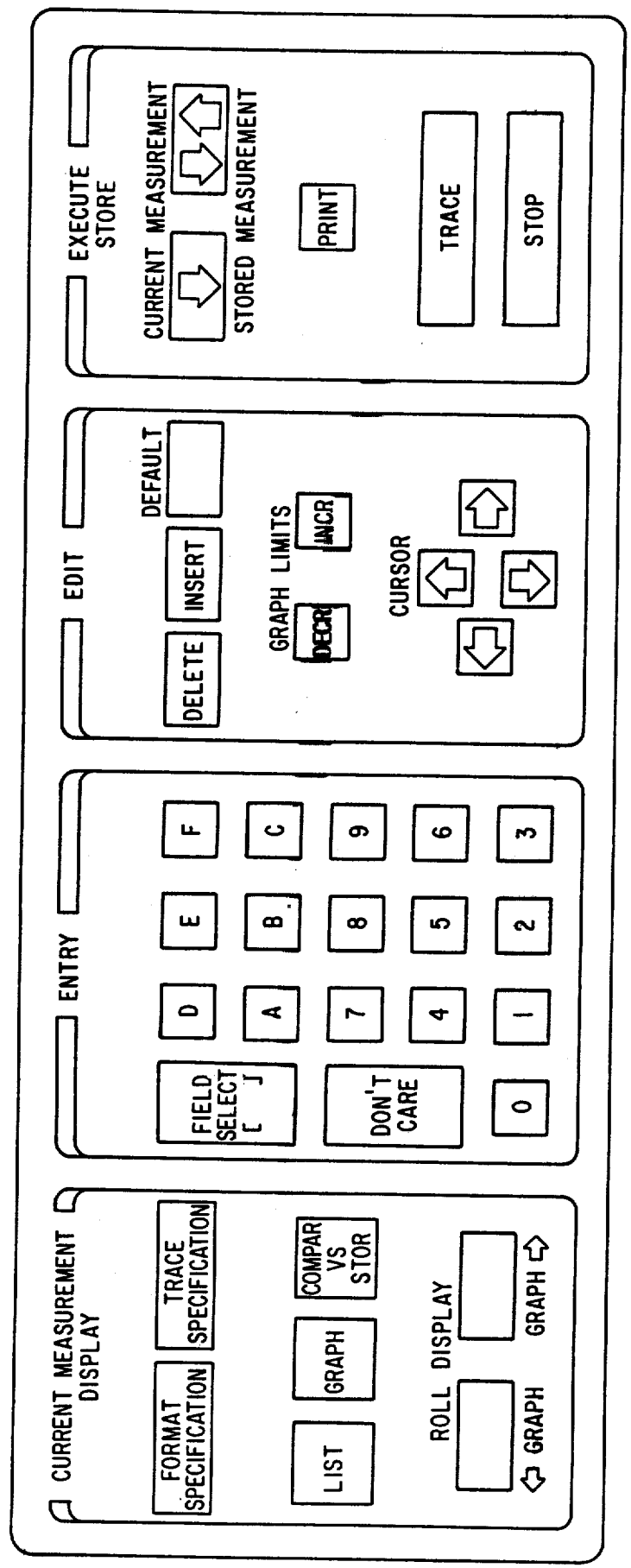
FIG. 6 illustrates the input keyboard.

Referring to FIG. 6, an illustration of the keyboard, the keys are functionally segregated into four blocks, the "current measurement display", "entry", "edit", and "execute". A power up sequence initially defines a default set of specifications, displays the default format specification, then automatically selects a hexadecimal trace list display. Activation of the "ROLL DISPLAY" keys permits the presentation of any portion of the 64 states stored. To change the format specification, the "FORMAT SPECIFICATION" key is pressed. The cursor keys in the edit block are used to move the cursor, designating a selectable entry field by a blinking inverse video field on the interactive display.

The trace specification can be edited by selecting the trace specification interactive display by activating the "trace specification" key. Editing is accomplished in the same manner as the format specification is edited. A general description of the functions of the individual keys is given in Appendix A. A detailed description of the interactive display entry fields is given in Appendix B.

DETAILED DESCRIPTION

Figure 7:
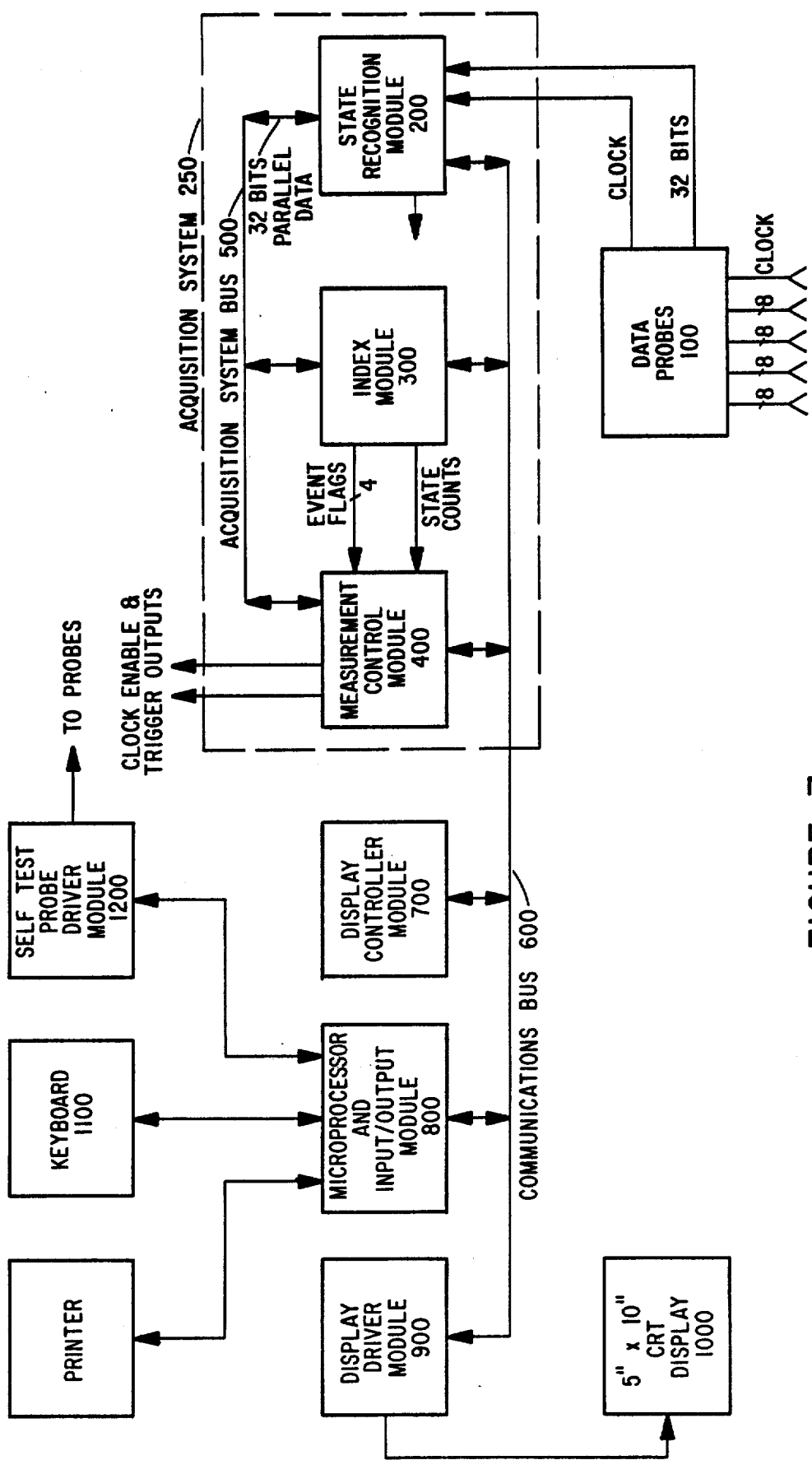
FIG. 7 illustrates a block diagram of the present invention.

Input states are sensed through 32 high impedance variable threshold data probes at rates up to 10 MHz. The data probes 100, illustrated in FIG. 7, are segmented into four 8 bit data pods and a fifth pod for clock sensing. Each pod may be preset to TTL logic threshold or variably adjusted in the range of +10 to −10 volts to interpret input logic levels.

The 32 input data channels and the clock signal from the data probes 100 are input to the state recognition module 200. An internal sampling clock is generated in response to the selected clock slope, the input data signals are compared to the selected threshold voltages and interpreted, and the data signals are latched in response to occurrences of the internal sampling clock. The state recognition module 200 outputs the sampled state to the high speed acquisition system bus 500. The index module 300 accesses the sampled state on the acquisition system bus 500, compares the sampled state to the selected state conditions and determines the trace position, selective storage events and state count events. The measurement control module 400 also accesses the acquisition system bus 500 and stores state or time counts and sampled data states in response to the events detected by the index module 300.

Figure 8:
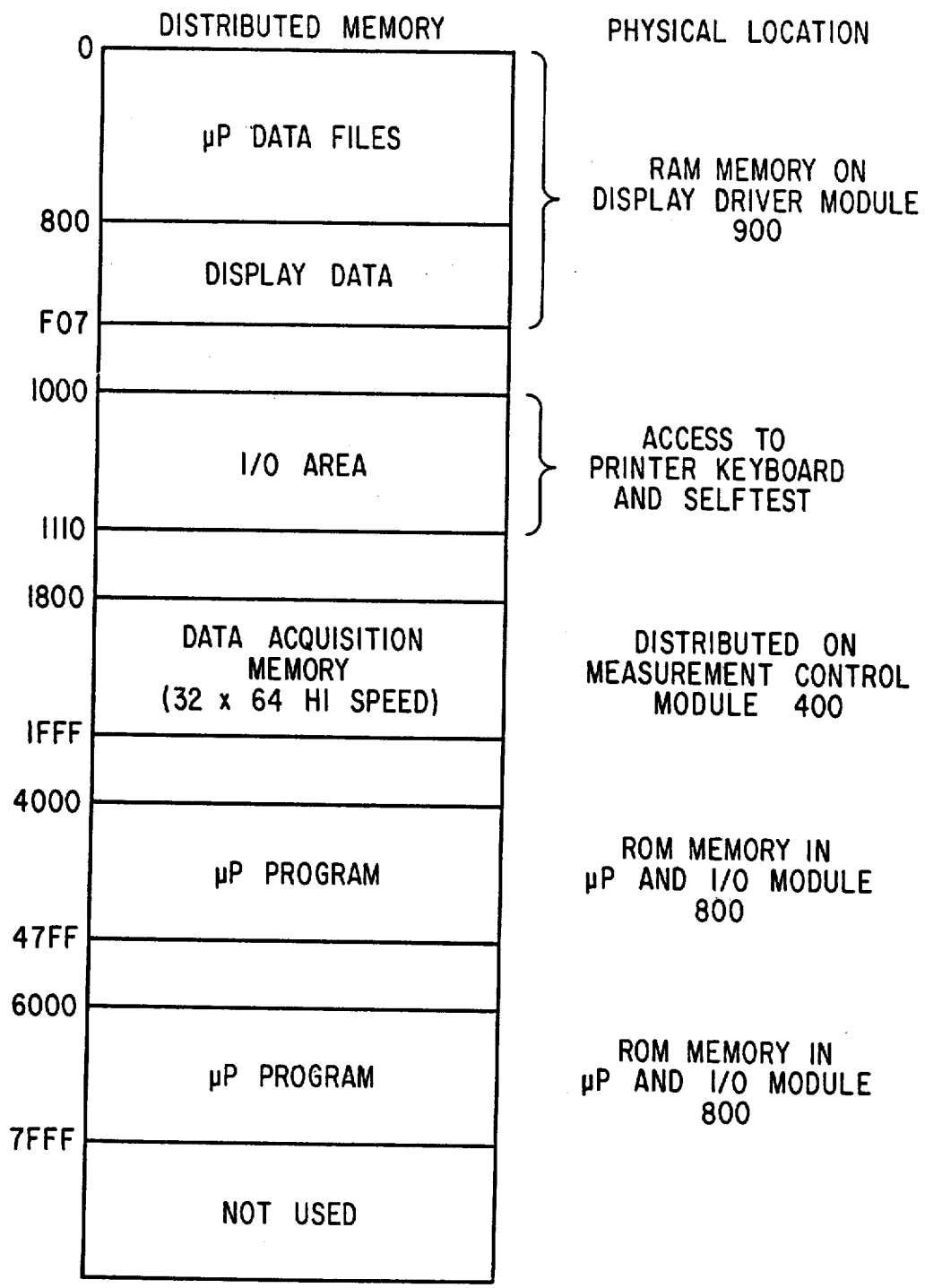
FIG. 8 illustrates the distributed memory addressing of the present invention.
Figure 9:
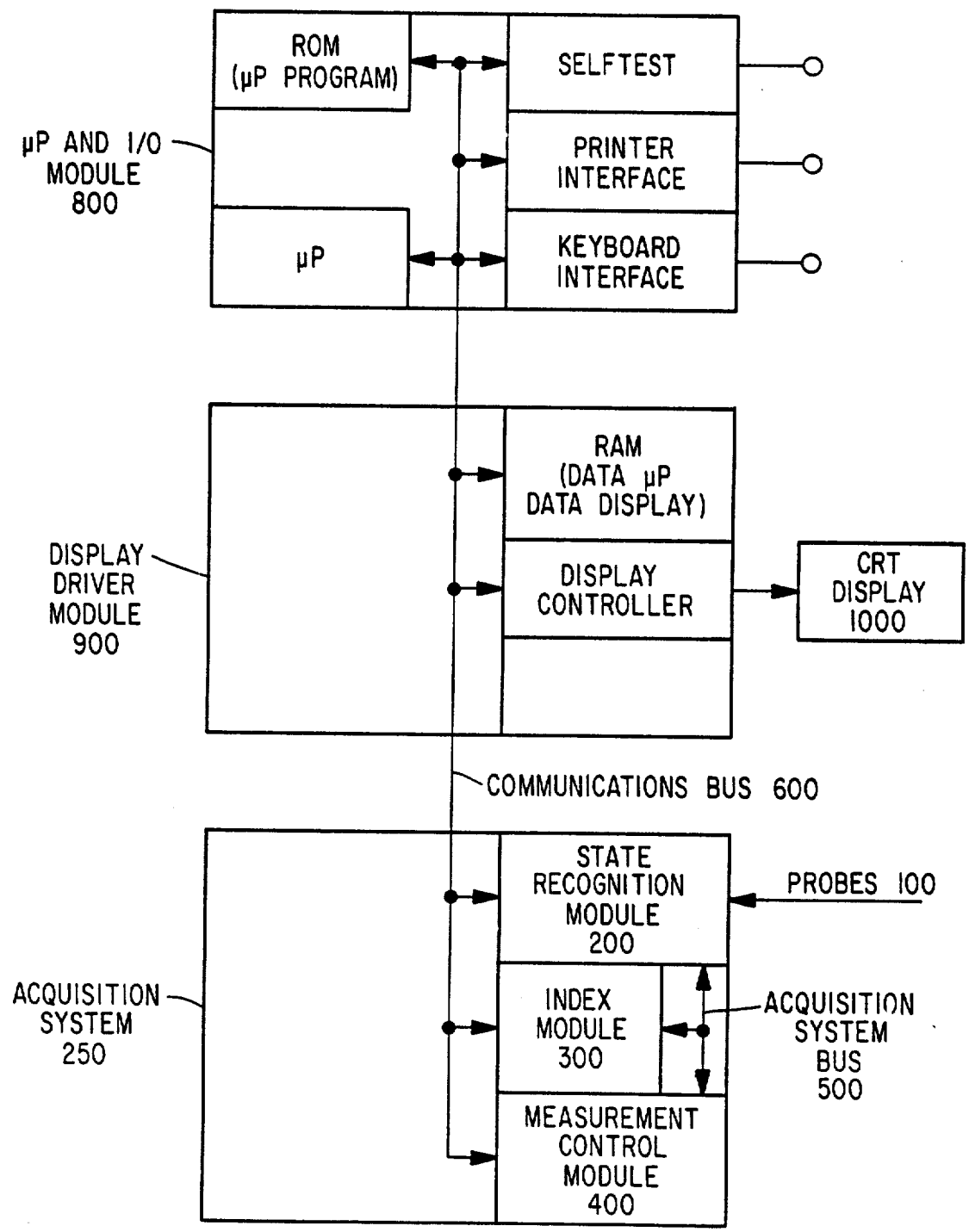
FIG. 9 illustrates the relationship between physical and logical addresses of the distributed memory of FIG. 8.

The modules of the acquisition system 250 communicate with other system modules via the communications bus 600, which prevides a means for addressing selected modules and for transferring selected data. The entire system functions as a distributed memory, as illustrated in FIG. 8. For instance, addresses between 1800 and 1FFF on the communications bus 600 access the state count measurements and the sampled data states stored in the measurement control module 400 memories. FIG. 9 shows another representation of the system architecture, illustrating the relationship between the physical couplings of FIG. 7 and the logical addresses of FIG. 8.

Figure 10:
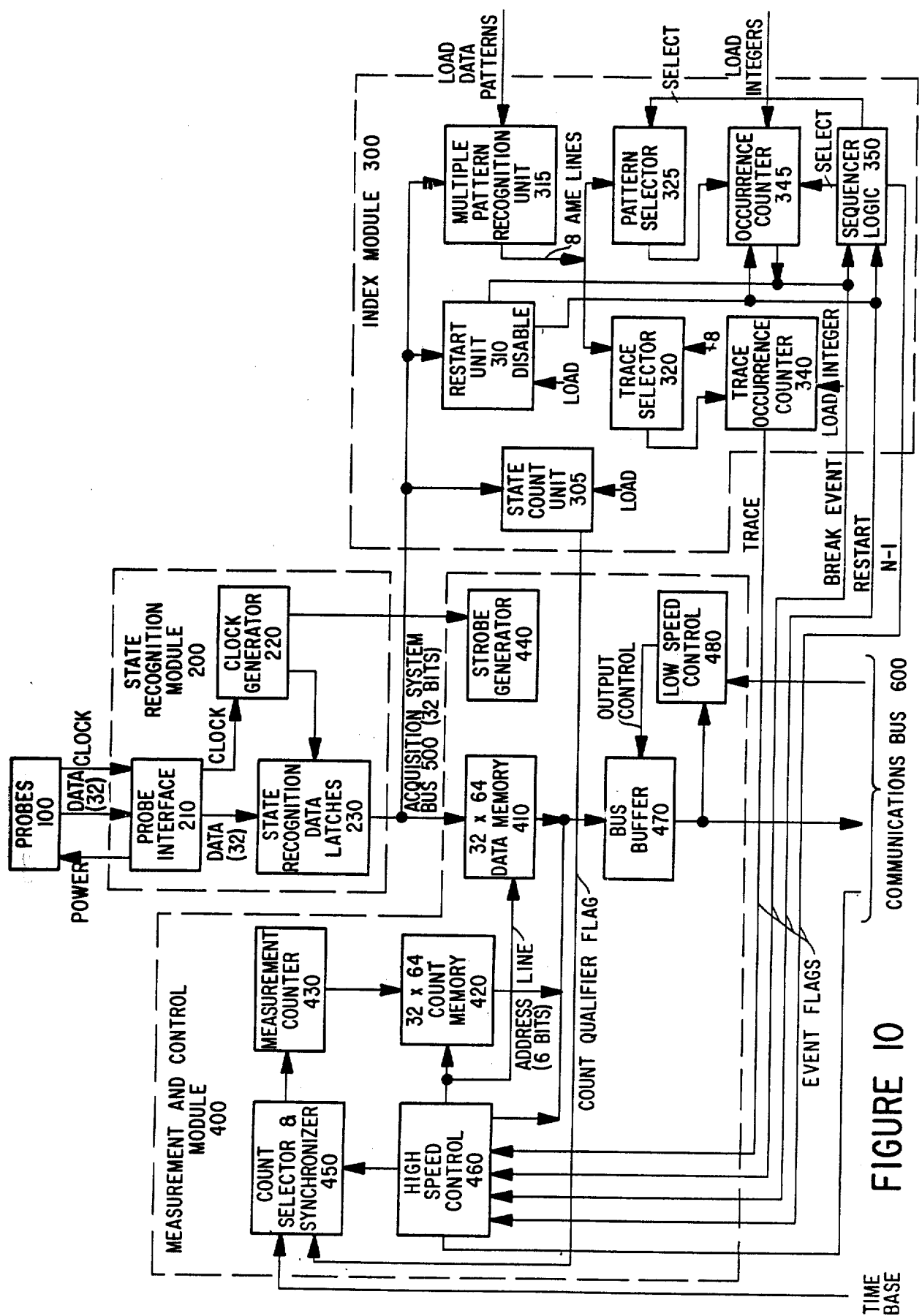
FIG. 10 is a block diagram of the acquisition system.
Figure 11:
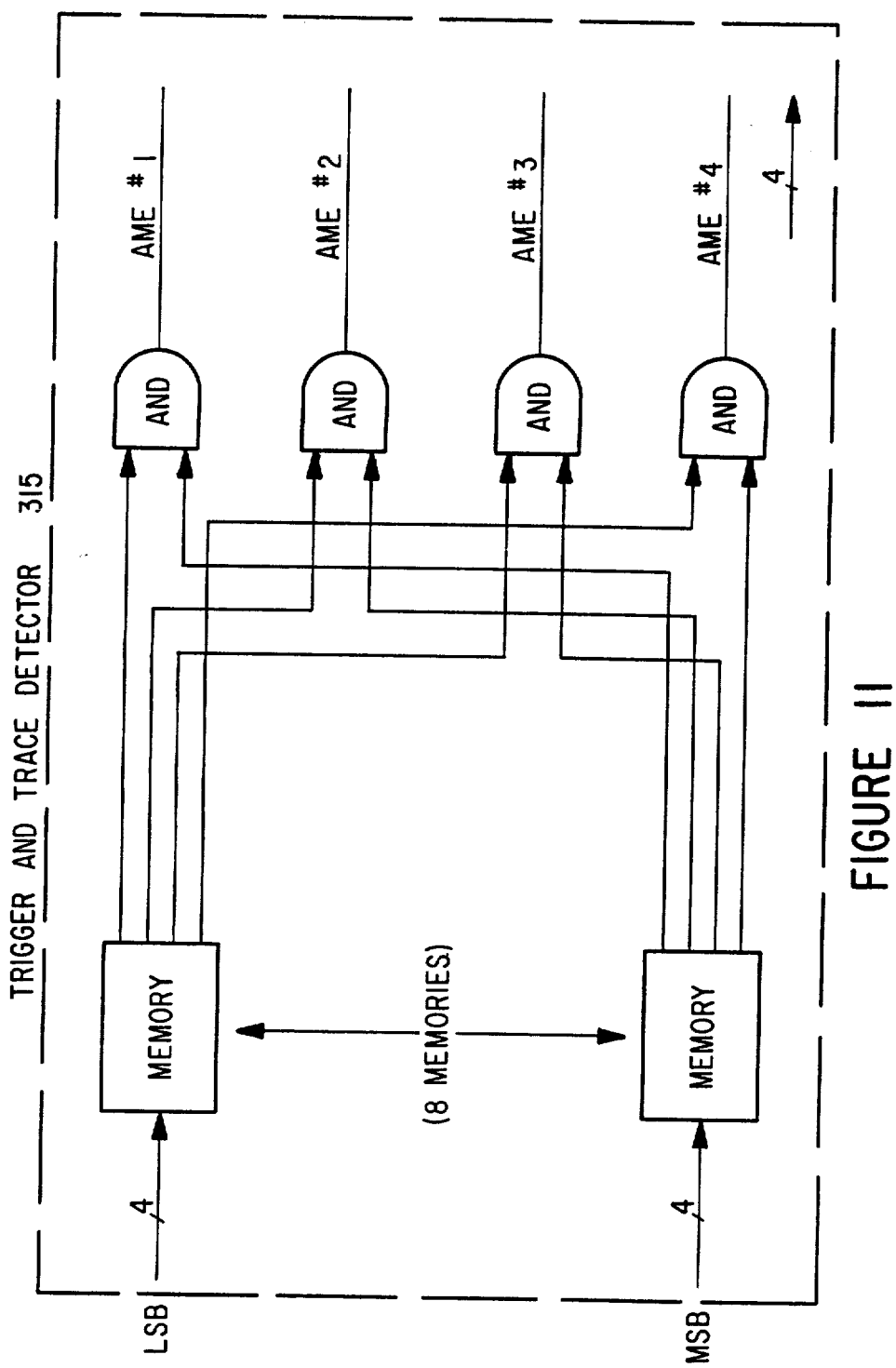
FIG. 11 illustrates a multiple pattern recognition unit.
Figure 12:
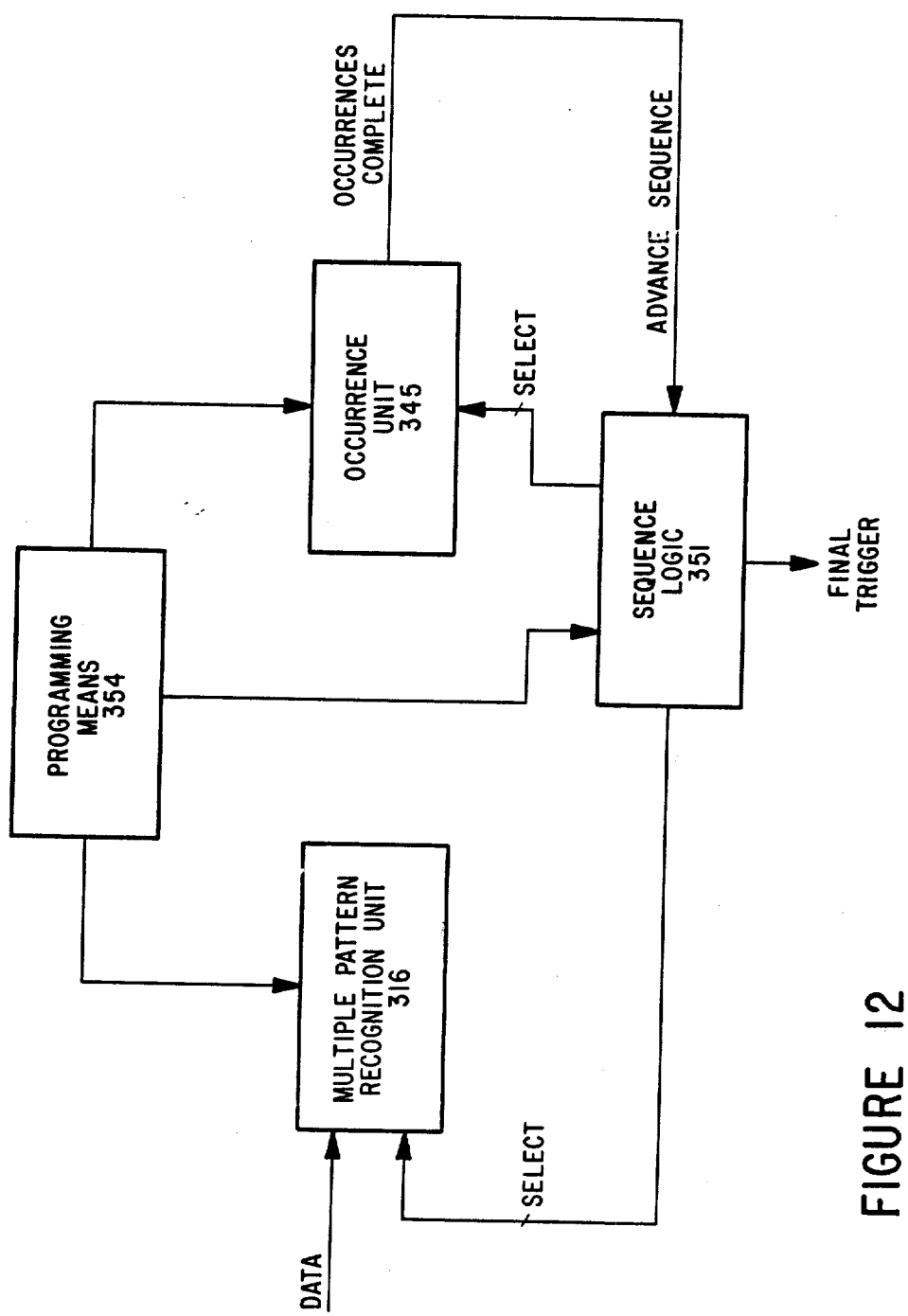
FIG. 12 illustrates a simplified sequential triggering circuit.

Referring to FIG. 10, the index module 300 detects the trace position by first comparing the sampled state on the acquisition system bus 500 with a qualifier state condition stored in the multiple pattern recognition unit 315. The multiple pattern recognition unit 315 comprises a digital pattern triggering circuit as described the copending patent application entitled "DIGITAL PATTERN TRIGGERING CIRCUIT", U.S. Patent Application Ser. No. 743,188 filed Nov. 19, 1976, by WILLIAM A. FARNBACH. As illustrated in FIG. 11, the multiple pattern recognition unit 315 comprises 2 pairs of 8 sixteen by four bit memories providing for the detection of up to eight qualifier state conditions, where each qualifier state condition is identified by a 1, 0, X input, format (in binary). Pattern selector 325 of FIG. 10 selects one of the eight lines output from the multiple pattern recognition unit and passes the selected output to the occurrence counter 345. The occurrence counter 345 counts the occurrences of the selected qualifier state conditions and provides an output in response to counting a specified number of occurrences of the selected qualifier state condition. This output is termed a "break event" and the sequencer logic 350 in response requests the pattern selector 325 to select the next sequential qualifier state condition and requests the occurrence counter 345 to select the corresponding count. The sequencer logic 350 also outputs a "N-1" event flag in response to detection of the occurrence of the "NEXT TO LAST BREAK EVENT". A simplified sequential triggering circuit is illustrated in FIG. 12 where the multiple pattern recognition unit 316 incorporates the functions of the multiple pattern recognition unit 315 and of the pattern selector 325. The sequence logic 351 incorporates the functions of the sequence logic 350 except that the final trigger is output in response to the completion of the state sequence. Another method of implementing the multiple pattern recognition unit 316 would be to have 3 selector bits be the most significant bits in the address, allowing the comparator to sequence through various segments of memory when comparing sequential state conditions of the state sequence.

Referring again to FIG. 10, the selective trace is incorporated in a similar manner except that the trace selector 320 of FIG. 10 can "OR" any combination of the AME lines. A trace occurrence counter 340 outputs a trace event flag upon counting each "nth" "ORED" AME event.

The restart unit 310 causes the sequence logic 350 to restart the satisfaction of the state sequence subsequent to the detection of a selected restart state condition. The restart unit is disabled for the data state corresponding to the detection of a break event by sequencer logic 350 which permits the state sequence to be satisfied without any unspecified intermediate state by setting the restart state condition to "any state".

The state count unit 305 strobes a counter in the measurement control module 400 each time the selected state condition to be counted is detected.

Figure 13:
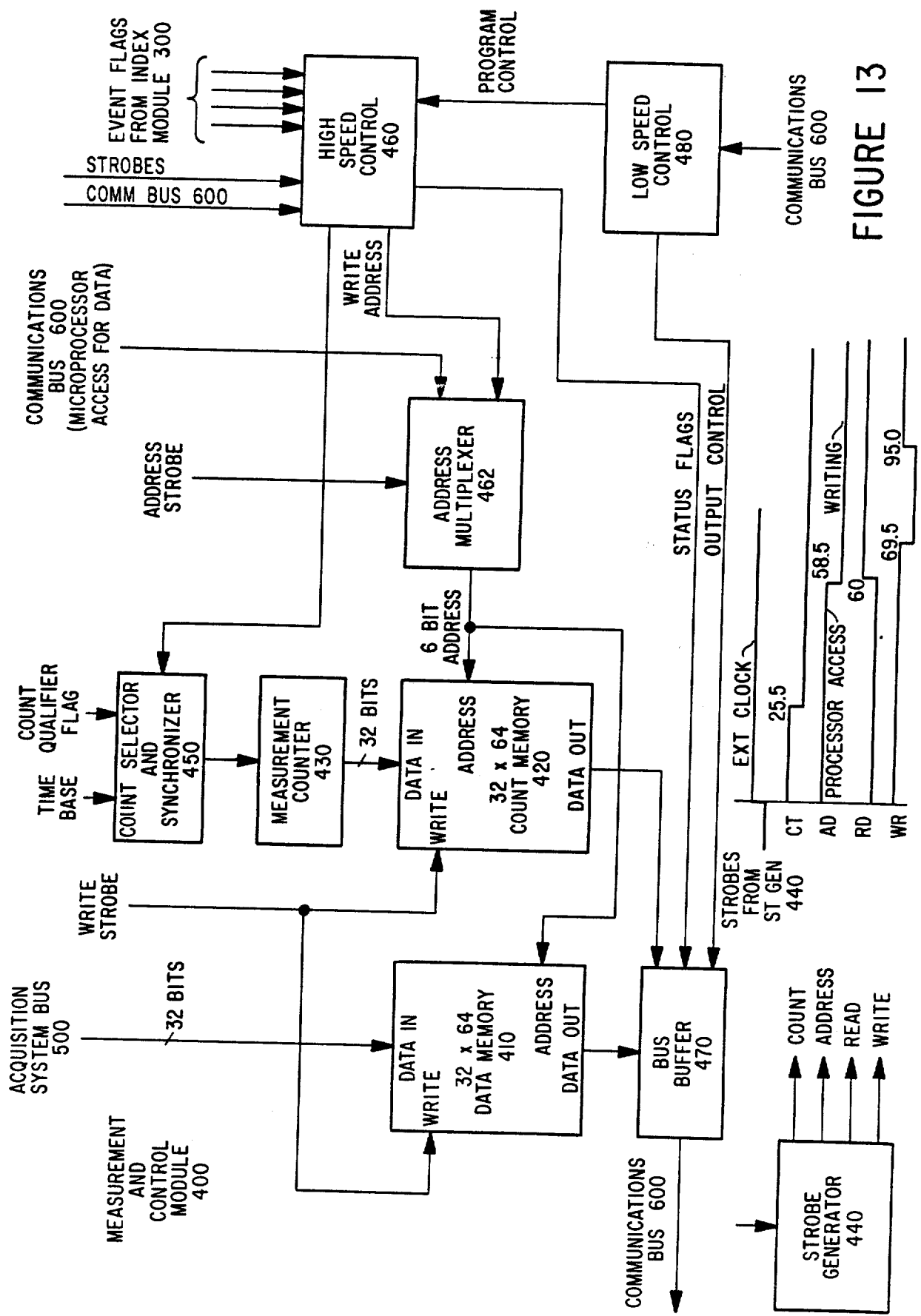
FIG. 13 illustrates the measurement and control module.
Figure 14:
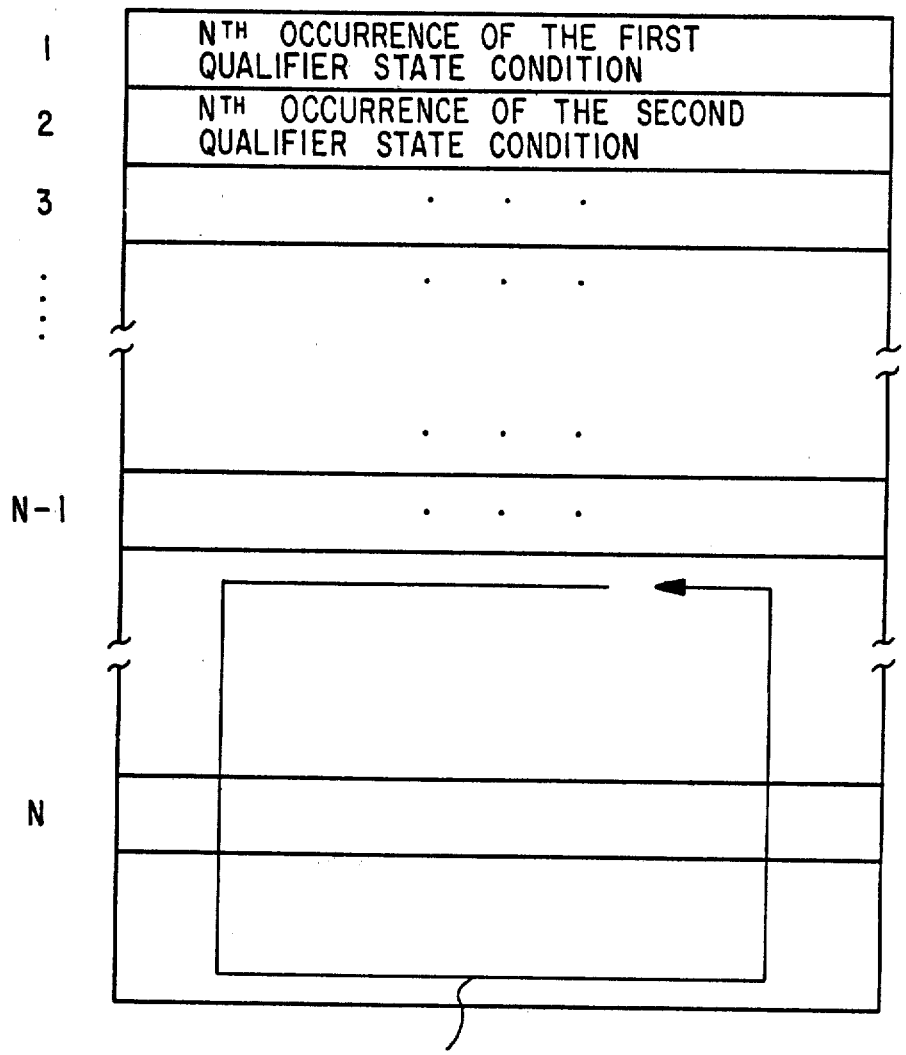
FIG. 14 illustrates the data format of the data memory.

The measurement and control module 400 is illustrated in FIGS. 10 and 13. The event flags from index module 300 are input to the high speed control 460 and determine which sampled states on the acquisition system bus 500 are to be stored. The high speed control 460 addresses the data memory 410 and the count memory 420 accordingly. FIG. 14 illustrates the data format of the data memory 410. The sampled state conditions resulting in break events are sequentially stored in locations 1-(N−1). Upon detection of the "N−1" event flag, sampled state conditions are sequentially written into the remaining memory locations, writing over the oldest data when the memory is filled. The trace position address of the memory location containing the state condition resulting in the final trigger is stored in a register and sampled states are written into the appropriate number of remaining storage locations. For example, if the trace was defined to end on the detection of the trace portion, no sampled states would be written subsequent to the detection of the trace position. The order of occurrence of the stored data is easily reconstructed by recovery of the trace position address appearing on the communications bus 600 as illustrated in FIG. 8. Count selector and synchronizer 450 controls the measurement counter 430, whose contents are stored in count memory 420 upon update of the memory address. The low speed control 480 provides a low speed interface for programming the high speed control 460 and for selecting and latching data for the communications bus 600 interface.

The strobe generator 400, illustrated in FIGS. 10 and 13, generates a sequence of strobes which, when coupled with a series of data latches (not shown) and timing logic (not shown) effectuate the orderly performance of machine tasks. In effect, a number of sampled states are simultaneously in various stages of processing at any one time and are "pipelined" through the required logic blocks.

ACTIVE CHANNEL DETERMINATION

Referring to FIG. 2, the symbol "!" appars below certain assigned input data channels in the format specification. Approximately once every millisecond the sampled state is compared to a "last sample" buffer. The states are exclusively "ORED" to detect any bit changes. The result is then "ANDED" with an activity buffer and the sampled state input to the "last sample" buffer. After 100 samples the activity buffer is sampled for display purposes. Only the assigned channels are displayed. Absence of a "!" indicates low channel activity and is a good indicator that a pod clip may have fallen off during the measurement or the channel is otherwise suspect.

APPENDIX A

GENERAL DESCRIPTION-KEYBOARD

CURRENT MEASUREMENT DISPLAY

LINES 3 THROUGH 24 ARE DEPENDENT ON DISPLAYED MENU CHOSEN, WHICH MAYBE SELECTED BY KEYS IN CURRENT MEASUREMENT BLOCK:

| | |
|---|---|
| FORMAT SPECIFICATION | SELECT CLOCK SLOPE AND FORMAT 32 CHANNELS INTO LOGICAL LABELS AND DESIRED LOGIC POLARITY AND NUMERICAL BASE. |
| TRACE SPECIFICATION | DEFINE TRACE POSITION,SELECTIVE TRACE AND COUNT MEASUREMENT. |
| LIST | DISPLAY RESULTANT CURRENT TRACE AND COUNT DATA. |
| GRAPH | GRAPH RESULTANT CURRENT TRACE DATA FOR SELECTED LABEL.THE 20 INTENSIFIED DOTS CORRESPOND TO TRACE LIST DATA. |
| COMPARE VS STORE | DISPLAY "EXCLUSIVE OR" OF VALID CURRENT DATA WITH VALID STORED DATA,AND SELECT COMPARED TRACE MODE. |
| RCLL DISPLAY GRAPH GRAPH | VIEW TRACE LIST OR TRACE COMPARE DATA. TRACE GRAPH SHOWS INTENSIFIED DOTS THAT REPRESENT THE TRACE LIST DATA DISPLAYED. |

ENTRY

ALL PROGRAM ENTRIES ARE MADE IN INVERSE VIDEO FIELDS AT THE BLINKING CURSOR,AND MAYBE CHANGED BY ENTRY BLOCK OF KEYS:

| | |
|---|---|
| FIELD SELECT [ ] | ALL FIELDS ENCLOSED WITH BRACKETS [ ] ARE CHANGED BY THIS KEY. THE 1610A SELECTS ONLY ALLOWED CHOICES. |
| 0-9,A-F,X | ALL OTHER FIELDS MAYBE CHANGED USING THESE KEYS. |

GENERAL DESCRIPTION-KEYBOARD

EDIT

DISPLAYED MENUS MAYBE EDITED BY EDIT BLOCK OF KEYS:

| | |
|---|---|
| DELETE  INSERT | USED IN TRACE SPECIFICATION MENU ONLY TO OPTIONALLY DELETE OR INSERT STATES TO SPECIFY TRACE POSITION AND SELECTIVE TRACE, A MAXIMUM OF 6 STATES MAYBE USED BETWEEN TRACE POSITION AND SELECTIVE TRACE. |
| DEFAULT | RETURN DISPLAYED MENU TO KNOWN (PRESET, TRACEABLE) CONDITION. |
| INCR  DECR | USED IN TRACE GRAPH ONLY TO AUTOMATICALLY CHANGE UPPER OR LOWER GRAPH LIMITS. |
| | TO MOVE BLINKING CURSOR TO DESIRED FIELD. |

EXECUTE

THE REMAINING KEYS ARE THE EXECUTE BLOCK OF KEYS:

| | |
|---|---|
| CURRENT MEASUREMENT | KEY SAVES CURRENT SPECIFICATION AND DATA MEASUREMENT IN A STORED FILE. THE |
| STORED MEASUREMENT | CURRENT SPECIFICATION AND DATA REMAINS UNCHANGED. |
| | KEY EXCHANGES CURRENT AND STORED MEASUREMENT FILES. |
| PRINT | PRINT CURRENT DISPLAY, EXCEPT TRACE GRAPH ON AN HP 9866 LINE PRINTER USING CONNECTOR ON REAR OF 1610A, TRACE LIST AND TRACE COMPARE WILL PRINT CURRENT PAGE AND ANY REMAINING DATA IN MEMORY. |
| TRACE | EXECUTES CURRENT SPECIFICATION, AND IF DISPLAY IS FORMAT SPECIFICATION OR TRACE SPECIFICATION, THE 1610A SWITCHES DISPLAY TO TRACE LIST. IF TRACE IS HELD DOWN, THE MEASUREMENT IS TRACED CONTINUOUSLY. IF COMPARE TRACE MODE IS SET FOR [STOP=] OR [STOP≠] THE MEASUREMENT IS TRACED UNTIL COMPARED CONDITION IS MET, THE INSTRUMENT STATUS (1ST LINE) IS "COMPARED TRACE=FAILED", IMPLIES CONDITION NOT MET, OR "COMPARED TRACE=COMPLETE", IMPLIES CONDITION MET. |
| STOP | STOPS ANY MEASUREMENT TRACE, COMPARED TRACE OR PRINT IN PROCESS. |

APPENDIX B

DETAILED FIELD/S DESCRIPTION

CLOCK SLOPE:

EXAMPLES:  CLOCK SLOPE (+)
           CLOCK SLOPE (-)

PURPOSE: TO SELECT CLOCK TRANSITION TO STROBE POD DATA INTO 1610A.

DETAILED FIELD/S DESCRIPTION

LABEL ASSIGNMENT AND ACTIVE CHANNELS:

```
EXAMPLE:    POD4      POD3      POD2      POD1
            7------0  7------0  7------0  7------0
            AAAAAAAA  AAAAAAAA  DDDDDDDD  XXXXXXXF
            11111111  11111111  11111111         1
                          ACTIVE CHANNELS
```

PURPOSE: TO ASSIGN LABELS A,B,C,D,E OR F TO ANY NUMBER OF
CONTINUOUS CHANNELS INDEPENDENT OF POD BOUNDARIES.
IN THE ABOVE EXAMPLE THE LABEL A
IS ASSIGNED TO 16 BITS OF POD3 AND POD4, AND MAY
REPRESENT A 16 BIT ADDRESS. LABEL D IS ASSIGNED 8 BITS
ON POD2 AND MAY REPRESENT AND 8 BIT DATA BUS. LABEL
F IS ASSIGNED TO BE A SINGLE BIT QUALIFIER (READ,
WRITE) AND IS ASSIGNED TO LEAST SIGNIFICANT BIT ON
POD1.
ANY UNUSED CHANNELS MAYBE TURNED OFF BY PUTTING A "X"
IN GIVEN CHANNELS.

COMMENT: AS MANY AS SIX LABELS OR AS FEW AS ONE MAYBE ASSIGNED
ACROSS THE 32 CHANNELS. IF A LABEL IS SPLIT, SUCH AS

```
            AABBBAAA       (LABEL IS NOT CONTINUOUS)
```

THEN AN ERROR MESSAGE "ERROR-SPLIT LABEL" IS DISPLAYED
AND THE CURSOR IS LOCKED TO LABEL ASSIGNMENT FIELDS UNTIL
THE ERROR IS CORRECTED.
PRESSING DEFAULT KEY WILL ASSIGN LABEL F TO ALL 32
CHANNELS.
ACTIVE CHANNELS ARE SHOWN BY "1" MARKS FOR EACH ASSIGNED
CHANNEL. ABSENCE OF "1" INDICATE LOW CHANNEL(BIT)
ACTIVITY, AND ARE GOOD INDICATORS OF POD CLIPS THAT MAY
HAVE FALLEN OFF. CHANNEL ACTIVITY IS NOT
DISPLAYED WHILE 1610A IS TRACEING.

IF POD IS CONNECTED TO DATA PORT ON REAR OF 1610A,
THE CHANNEL ACTIVITY "1" FOR LEAST SIGNIFICANT 2 BITS
IS NOT SHOWN( DUE TO SYNCHRONOUS 8 BIT COUNT AND
1610A).

DETAILED FIELD/S DESCRIPTION

LOGIC POLARITY:

```
EXAMPLE:    LABEL           A    D    F
            LOGIC POLARITY [-]  [-]  [+]
            (+,-)
```

PURPOSE: TO SELECT A LOGIC POLARITY FOR EACH ASSIGNED LABEL.

DETAILED FIELD/S DESCRIPTION

NUMERICAL BASE:

```
EXAMPLE:    LABEL                 A      B      F
            NUMERICAL BASE      [HEX]  [OCT]  [BIN]
            (BIN,OCT DEC,HEX)
```

PURPOSE: TO SELECT A NUMERICAL BASE TO BE HEXIDECIMAL(HEX),
OCTAL(OCT),DECIMAL(DEC),OR BINARY(BIN) FOR
EACH ASSIGNED LABEL.

DETAILED FIELD/S DESCRIPTION

TRACE POSITION:

EXAMPLE:   [START ] TRACE
           [CENTER] TRACE
           [ END ] TRACE

PURPOSE: TO SELECT TRACE POSITION TO BE SOME GIVEN STATE
AND ITS POSITION IN RESULTANT DATA TRACE FILE
SHOULD BE AT [START] FOLLOWED BY SELECTIVE TRACE
STATES,OR AT [CENTER] SHOWING ANY SELECTIVE STATES
BEFORE AND AFTER "CENTER STATE",OR AT [END]
SHOWING ANY SELECTIVE STATES BEFORE THE "END STATE".

EXAMPLE:   LABEL              A         OCCUR
           BASE               HEX       DEC

FIND IN SEQUENCE   10        00001
               THEN           20        00001
               THEN           30        00005
           [START ] TRACE     40        00001

SEQ.RESTART [ON]   50

COMMENT: THIS EXAMPLE HAS THE FOLLOWING MEANING FOR DEFINING
TRACE POSITION:
FIND IN SEQUENCE 00001 OCCURANCE OF STATE 10,THEN
THE 00001 OCCURANCE OF STATE 20, THEN THE 00005 OCCURANCE
OF STATE 30,AND [START]*TRACE AT 00001 OCCURANCE
OF STATE 40.
IF DURING THIS SEQUENCE THE RESTART STATE 50 IS
ENCOUNTERED BEFORE REACHING THE 00001 OCCURANCE OF
STATE 40,THE MEASUREMENT RESTARTS,TO FIND IN SEQUENCE
THE 00001 OCCURANCE OF STATE 10,THEN 00001 OCCURANCE
OF STATE 20 ETC.

NOTE: IF A SEQUENCE STATE IS DEFINED TO BE THE SAME AS THE
RESTART STATE,THE SEQUENCE STATE DOMINATES.
IF [CENTER] OR [END] WERE SELECTED,SELECTIVE
TRACE STARTS AT COMPLETION OF 5 OCCURANCES
OF STATE 30 (SEE SELECTIVE TRACE).

DETAILED FIELD/S DESCRIPTION

SELECTIVE TRACE:

EXAMPLE:   LABEL       A      OCCUR
           [ALL STATES]

PURPOSE: TO TRACE ALL STATES.

EXAMPLE:   LABEL       A      OCCUR
           BASE        HEX    DEC
           TRACE
           [ONLY STATE]       60     00001
                OR            7X
                OR            8X

PURPOSE: TO SELECTIVELY TRACE DESIRED STATES.

COMMENTS: THE ABOVE EXAMPLE HAS FOLLOWING MEANING:
DO A SIMULTANEOUS TRACE OF 00001 OCCURANCE
OF STATES 60 OR 7X (70 TO 7F) OR
8X (80 TO 8F).

DETAILED FIELD/S DESCRIPTION

COUNT:

EXAMPLE:  LABEL    A
          BASE     HEX

COUNT [OFF]
          COUNT [STATE]   7X
          COUNT [TIME]

PURPOSE: TO SELECT COUNT MEASUREMENT TO BE [OFF], OR COUNT [STATE] OR COUNT [TIME].

COMMENT: WHEN COUNT IS [OFF], THE TRACE LIST DOES NOT SHOW COUNT DATA FOR THE NEXT TRACE MEASUREMENT.
WHEN COUNT [STATE] IS SELECTED, A 32 BIT COUNT OF SELECTED STATE 7X (70 TO 7F) IS STORED IN MEMORY WITH EACH POD DATA STATE STORED. THE RESULTANT COUNT DATA IS DISPLAYED IN TRACE LIST FOR NEXT TRACE MEASUREMENT.
WHEN COUNT [TIME] IS SELECTED, A COUNT VALUE OF TIME IS STORED FOR EACH POD DATA STATE STORED IN MEMORY. THE RESULTANT TIME DATA IN DISPLAYED IN TRACE LIST FOR NEXT TRACE MEASUREMENT.

DETAILED FIELD/S DESCRIPTION

STATE COUNT OR TIME [ABS],[REL]:

EXAMPLE:  LABEL     A      STATE COUNT
          BASE      HEX    DEC
                           [ABS]

SEQUENCE  10   -  1043
          SEQUENCE  20   -  1033
          SEQUENCE  30   -  1023
          START     40      0
          +01       60   +  20
          +02       70   +  30
          +03       71   +  31

LABEL     A      STATE COUNT
          BASE      HEX    DEC
                           [REL]
          SEQUENCE  10
          SEQUENCE  20      10
          SEQUENCE  30      20
          START     40      1023
          +01       60      20
          +02       70      10
          +03       71      1

LABEL     A      TIME
          BASE      HEX    DEC
                           [ABS]
          SEQUENCE  10   -  226.3 US
          SEQUENCE  20   -  206.2 US
          SEQUENCE  30   -  185.1 US
          START     40      .8 US
          +01       60   +  80.6 US
          +02       70   +  122.5 US
          +03       71   +  122.5 US

PURPOSE: TO VIEW TRACE LIST AND SELECT [ABS] OR
[REL] FOR STATE COUNT OR TIME DATA.

COMMENTS: WHEN ABSOLUTE [ABS] IS SELECTED THEN STATE COUNT
OR TIME IS DISPLAYED IN +/- ABSOLUTE VALUES WITH
RESPECT TO START STATE 40. ALL STATES BEFORE START
STATE 40 ARE SHOWN WITH "-" COUNT VALUES. START
STATE 40 IS SHOWN AS ALWAYS 0. ALL STATES SHOWN
AFTER START STATE 40 ARE SHOWN WITH "+" COUNT
VALUES.
WHEN RELATIVE [REL] IS SELECTED, THEN STATE COUNT
OR TIME IS DISPLAYED SHOWING COUNT VALUES RELATIVE
TO PREVIOUS STATE COUNT VALUE (IF VALID)
WITHOUT SIGN.

DETAILED FIELD/S DESCRIPTION

GRAPHED LABEL:

EXAMPLE:
    GRAPHED LABEL [A]

GRAPHED LABEL [F]

PURPOSE: TO SELECT A DEFINED LABEL A,B,C,D,E OR F TO BE
GRAPHED.

DETAILED FIELD/S DESCRIPTION

UPPER/LOWER LIMITS:

EXAMPLE:
    UPPER LIMIT
       177

LOWER LIMIT
       000

PURPOSE: TO CHANGE UPPER OR LOWER GRAPH LIMITS.

COMMENT: GRAPH LIMITS MAYBE CHANGED USING ENTRY KEYS OR
THE LIMITS MAYBE AUTOMATICALLY INCREMENTED OR
DECREMENTED USING  INCR   OR   DECR  KEYS
IN EDIT BLOCK.
THE UPPER LIMIT MUST BE GREATER THAN LOWER LIMIT,
ELSE AN "ERROR-OVERLAPPING LIMITS" IS DISPLAYED
AND GRAPH DOTS ARE NOT DISPLAYED.

DETAILED FIELD/S DESCRIPTION

COMPARED TRACE MODE:

| EXAMPLE: | LABEL | A | COMPARED |
|---|---|---|---|
| | BASE | HEX | TRACE MODE |
| | | | (OFF) |
| | SEQUENCE | 00 | |
| | SEQUENCE | 00 | |
| | SEQUENCE | 00 | |
| | START | 00 | |
| | +01 | 38 | |
| | +02 | 00 | |

PURPOSE: TO SHOW THE "EXCLUSIVE OR" OF CURRENT DATA WITH
STORED DATA. ALL 0'S IMPLIES SAME DATA IN BOTH FILES

AND NCN B'S (3E) SHOWS THAT DATA STATE DOES NOT
COMPARE (BITS 4 AND 5 ,ASSUMING LSB IS BIT 0).

| EXAMPLE: | LABEL | A | COMPARED |
|---|---|---|---|
| | BASE | HEX | TRACE MODE |
| | | | (STOP=) |
| | LABEL | A | COMPARED |
| | BASE | HEX | TRACE MODE |
| | | | (STOP≠) |

PURPOSE: TO SELECT COMPARED TRACE MODE TO BE STOP WHEN EQUAL
(STOP=), OR STOP WHEN NOT EQUAL (STOP≠).

COMMENTS: WHEN (STOP=) IS CHOSEN THE MEASUREMENT IS TRACED
UNTIL VALID CURRENT DATA EQUALS (=) VALID STORED
DATA. THE STATUS OF INSTRUMENT WILL BE:

"COMPARED TRACE-FAILED"

WHICH MEANS CURRENT DATA DOES NOT EQUAL STORED
DATA. THE 1610A THEN TRACES AGAIN SHOWING:

"COMPARED TRACE-IN PROCESS"

AND COMPARES ANOTHER SET OF DATA. THIS PROCESS
CONTINUES UNTIL:

"COMPARED TRACE-COMPLETE"

WHICH MEANS VALID CURRENT FILE EQUALS VALID STORED FILE
DATA.
A SIMILAR OPERATION EXISTS FOR (STOP≠), EXCEPT THIS
MEASUREMENT CONTINUES UNTIL FILES DO NOT COMPARE.
NOTE: THIS IS NOT A REAL TIME MEASUREMENT, BUT RATHER
A "SAMPLED COMPARED MODE" THAT IS DEPENDENT IN PART
UPON DATA CLOCK RATES, TRACE SPECIFICATION.
THIS MEASUREMENT MODE MUST BE TURNED (OFF)
TO OBTAIN SINGLE OR CONTINUOUS TRACE MODE.

We claim:
1. Apparatus for selecting and storing a sequence of logic state values occurring in a collection of digital signals and for graphing the stored logical values of an ordered set of digital signals selected from among the collection thereof, the apparatus comprising:
control means for designating from among the collection of digital signals an ordered set thereof defining a value that varies in accordance with the logical values of the members of the ordered set, and for designating a trigger condition;
input means coupled to receive the collection of digital signals, for performing signal conditioning thereon according to preselected thresholds and polarities to produce a collection of conditioned signals that includes an ordered set of conditioned signals representing the ordered set of digital signals designated with the control means;
trigger means coupled to the collection of conditioned signals and to the control means, for producing a trigger signal upon the occurrence of the designated trigger condition;
storage means including an ordered series of locations, the storage means coupled to the trigger signal and to the ordered set of conditioned signals, for storing in an initial location of the ordered series of locations the value possessed by the ordered set of conditioned signals upon the occurrence of the trigger signal, and for storing into consecutive locations of a remaining portion of the ordered series of locations values assumed by the ordered set of conditioned signals subsequent to the occurrence of the trigger signal; and
graphic display means coupled to the storage means and to the control means, for displaying with cartesian coordinates a graph of the values of the ordered set of conditioned signals stored in the storage means, one axis of the cartesian coordinates representing the range of possible assumable values for the ordered set, and the other axis representing the ordered series of locations in the storage means.

2. Apparatus as in claim 1 wherein the control means is additionally for selecting for storage by the storage means a subset of the collection of values assumed by the ordered set of digital signals, and wherein the storage means stores no values of the ordered set of conditioned signals that do not correspond to the selected subset.

3. Apparatus for selecting and storing a sequence of logic state values occurring in a collection of digital signals and for graphing the stored logical values of an ordered set of digital signals selected from among the collection thereof, the apparatus comprising:

control means for designating from amoung the collection of digital signals an ordered set thereof defining a value that varies in accordance with the logical values of the members of the ordered set, for designating a qualifier condition, and for designating a trigger condition;

input means coupled to receive the collection of digital signals, for performing signal conditioning thereon according to preselected thresholds and polarities to produce a collection of conditioned signals that includes an ordered set of conditioned signals representing the ordered set of digital signals designated with the control means;

trigger means coupled to the collection of conditioned signals and to the control means, for producing a trigger signal upon the occurrence of the designated trigger condition;

storage qualification means coupled to the collection of conditioned signals and to the control means, for producing a qualification signal upon the occurrence of the designated qualifier condition;

storage means including a circular buffer, the storage means coupled to the collection of conditioned signals, to the trigger signal and to the qualification signal, for storing in consecutive locations in the circular buffer the series of logic state values producing qualification signals, and for storing in the next consecutive location of the circular buffer the logic state value producing the trigger signal;

graphic display means coupled to the storage means and to the control means, for displaying with cartesian coordinates a graph of the values of the ordered set of conditioned signals stored in the storage means, one axis of the cartesian coordinates representing the range of possible assumable values for the ordered set, and the other axis representing the ordered series of locations in the storage means.

4. Apparatus for selecting and storing a sequence of logic state values occurring in a collection of digital signals and for graphing the stored logical values of an ordered set of digital signals selected from among the collection thereof, the apparatus comprising:

control means for designating from among the collection of digital signals an ordered set thereof defining a value that varies in accordance with the logical values of the members of the ordered set, for designating an ordered list of sequence conditions $SC_1, \ldots, SC_n$, for designating a qualifier condition, and for designating a trigger condition;

input means coupled to receive the collection of digital signals, for performing signal conditioning thereon according to preselected thresholds and polarities to produce a collection of conditioned signals that includes an ordered set of conditioned signals representing the ordered set of digital signals designated with the control means;

sequence detection means coupled to the collection of conditioned signals and to the control means, for producing a sequence signal upon the occurrence of the designated sequence condition $SC_1$, for producing the sequence signal each time any additional designated sequence condition $SC_x$ in the ordered list occurs, and so on until the production of the sequence signal upon the occurrence of the last designated sequence condition $SC_n$, and for producing an arming signal upon the occurrence of the last designated sequence condition $SC_n$;

trigger means coupled to the collection of conditioned signals and to the control means, for producing a trigger signal upon the occurrence of the designated trigger condition;

storage qualification means coupled to the collection of conditioned signals, to the control means and to the arming signal, for producing a qualification signal upon the occurrence of the designated qualifier condition subsequent to the occurrence of the arming signal;

storage means having a first portion with as many locations as designated sequence conditions in the ordered sequence thereof, and also having a circular buffer portion, the storage means coupled to the collection of conditioned signals, to the sequence signal, to the qualification signal and to the trigger signal, for storing the series of logic state values producing signals into the first portion of the storage means until the occurrence of the arming signal, for storing in consecutive locations in the circular buffer the series of logic state values producing qualification signals, and for storing the next consecutive location in the circular buffer the logic state value producing the trigger signal;

graphic display means coupled to the storage means and to the control means, for displaying with cartesian coordinates a graph of the values of the ordered set of conditioned signals stored in the storage means, one axis of the cartesian coordinates representing the range of possible assumable values for the ordered set, and the other axis representing the ordered series of locations in the storage means.

5. Apparatus as in claims 3 or 4 wherein the control means is additionally for designating an integer L, and further wherein the storage means stores into the L-many consecutive next locations in the circular buffer following the occurrence of the trigger signal the next L-many logic state values producing a qualifier signal.

6. Apparatus as in claims 1, 3 or 4 wherein the control means is additionally for designating upper and lower graph limits, and wherein the graphic display restricts the axis representing the range of possible assumable values for the ordered set to the range specified by the designated upper and lower graph limits.

* * * * *

UNITED STATES PATENT AND TRADEMARK OFFICE
CERTIFICATE OF CORRECTION

PATENT NO. : 4,303,987

DATED : December 1, 1981

INVENTOR(S) : George A. Haag et al

It is certified that error appears in the above—identified patent and that said Letters Patent is hereby corrected as shown below:

Column 1, line 14, after "present" insert --patent--;

Column 7, line 16, "appars" should be --appears--;

Column 21, line 6, "amoung" should be --among--;

Column 22, line 32, after "producing" insert --sequence--;

Column 22, line 36, after "storing" insert --in--;

Signed and Sealed this

Ninth Day of March 1982

[SEAL]

Attest:

*Attesting Officer*

GERALD J. MOSSINGHOFF

*Commissioner of Patents and Trademarks*